US010678480B1

(12) United States Patent
Armangau et al.

(10) Patent No.: US 10,678,480 B1
(45) Date of Patent: Jun. 9, 2020

(54) DYNAMIC ADJUSTMENT OF A PROCESS SCHEDULER IN A DATA STORAGE SYSTEM BASED ON LOADING OF THE DATA STORAGE SYSTEM DURING A PRECEDING SAMPLING TIME PERIOD

(71) Applicant: EMC IP Holding Company LLC, Hopkinton, MA (US)

(72) Inventors: Philippe Armangau, Acton, MA (US); Bruce A. Zimmerman, Concord, MA (US); John P. Didier, Westborough, MA (US); Rustem Rafikov, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/263,301

(22) Filed: Jan. 31, 2019

(51) Int. Cl.
*G06F 3/00* (2006.01)
*G06F 3/06* (2006.01)
*G06F 9/48* (2006.01)
*G06F 12/0808* (2016.01)
*G06F 12/0842* (2016.01)

(52) U.S. Cl.
CPC ............ *G06F 3/0659* (2013.01); *G06F 3/061* (2013.01); *G06F 3/067* (2013.01); *G06F 3/0653* (2013.01); *G06F 9/4887* (2013.01); *G06F 12/0808* (2013.01); *G06F 12/0842* (2013.01); *G06F 2209/483* (2013.01)

(58) Field of Classification Search
CPC .................................................. G06F 9/4881
See application file for complete search history.

(56) References Cited

U.S. PATENT DOCUMENTS

| 8,195,859 | B2 | 6/2012 | Le Moal | |
|---|---|---|---|---|
| 8,839,209 | B2 * | 9/2014 | Gallagher | ................. G06F 9/44 717/130 |
| 8,959,509 | B1 * | 2/2015 | Sobel | ................... G06F 9/4843 718/1 |
| 9,959,138 | B1 | 5/2018 | Vaish et al. | |

(Continued)

OTHER PUBLICATIONS

Ishkov, Nikita, "A complete guide to Linux process scheduling," University of Tampere, School of Informational Sciences, Computer Science, M.Sc: Thesis, Feb. 2015, 62 pages.

(Continued)

*Primary Examiner* — Tammara R Peyton
(74) *Attorney, Agent, or Firm* — BainwoodHuang

(57) ABSTRACT

Technology for dynamically adjusting a process scheduler in a storage processor of a data storage system. An average amount of host data contained in sets of host data processed by host I/O request processing threads is calculated. An average amount of time required for each host I/O request processing thread to execute to completely process the average amount of host data contained in a set of host data is also calculated. Operation of the process scheduler in the storage processor is then adjusted to cause the process scheduler to subsequently allocate the processor in the storage processor to host I/O request processing threads in timeslices having a duration that is at least as large as the average amount of time required for each host I/O request processing thread to execute to completely process the average amount of host data contained in a set of host data.

15 Claims, 6 Drawing Sheets

(56) References Cited

U.S. PATENT DOCUMENTS

| | | | | |
|---|---|---|---|---|
| 2002/0087611 A1* | 7/2002 | Tanaka | ............... | G06F 9/5077 |
| | | | | 718/1 |
| 2008/0082983 A1* | 4/2008 | Groetzner | ............ | G06F 9/5083 |
| | | | | 718/105 |
| 2011/0276979 A1* | 11/2011 | Isani | .................. | G01S 19/23 |
| | | | | 718/104 |
| 2013/0111470 A1* | 5/2013 | Bozek | ............... | G06F 9/4881 |
| | | | | 718/1 |

OTHER PUBLICATIONS

Kumar, Avinesh, "Multiprocessing with the Completely Fair Scheduler," IBM, Jun. 5, 2009, <<http://homepage.smc.edu/morgan_david/cs40/multimedia/cfs_scheduler_ibm1_pdf>> accessed Feb. 28, 2019, 11 pages.

\* cited by examiner

OVERHEAD TABLE 169

| NO_DATA_SERVICES_OVERHEAD 300 | DECOMP_OVERHEAD 302 | DEDUP_OVERHEAD 304 | COMPRESS_OVERHEAD 306 |
|---|---|---|---|

DYNAMIC ADJUSTMENT OF A PROCESS SCHEDULER IN A DATA STORAGE SYSTEM BASED ON LOADING OF THE DATA STORAGE SYSTEM DURING A PRECEDING SAMPLING TIME PERIOD

TECHNICAL FIELD

The present disclosure relates generally to intelligent data storage systems, and more specifically to technology for dynamically adjusting a process scheduler in a data storage system based on loading of the data storage system.

BACKGROUND

Data storage systems are arrangements of hardware and software that include non-volatile data storage devices (e.g. electronic flash drives, magnetic disk drives, and/or optical drives) that are used to provide non-volatile storage for processing host I/O (Input/Output) requests (i.e. write requests and/or read requests) received from one or more host computers. The host I/O requests that are processed by a data storage system may include block I/O requests as well as file I/O requests. The host I/O requests specify one or more data objects (e.g. logical disks or "LUNs" and/or files or file systems) that are hosted on the data storage system and indicate host data that is to be written to or read from the data objects. The data storage system storage performs various data storage services that organize and secure host data received from the host machines on the non-volatile data storage devices.

SUMMARY

Software threads referred to as host I/O request processing threads may be executed within a data storage system to process the host I/O requests received by the data storage system. The processor(s) within the data storage system is/are allocated to execute the host I/O request processing threads by a scheduler within an operating system of the data storage system. Previous data storage systems have exhibited performance shortcomings related to how host I/O request processing threads are scheduled on the processor(s) of the data storage system. While some process schedulers operate based on parameters that determine how the scheduler schedules threads for execution, in previous data storage systems those parameters have been statically set to values defined by the specific version of the operating system. Under certain host I/O request workloads, these statically set scheduler parameters have resulted in host I/O request processing threads being scheduled for execution in ways that cause high levels of latency with regard to completion of host I/O requests by the data storage system. For example, some workloads result in previous data storage systems using a length of timeslice for executing host I/O request processing threads that causes frequent preemption of host I/O request processing threads prior to completion of specific tasks. As a result, significant delays may be incurred while the scheduler executes other threads on the processor prior to resuming execution of the preempted host I/O request processing threads. Such delays became especially large in cases where large numbers of host I/O request processing threads shared the same processor.

It would accordingly be desirable to have new data storage system technology in which the process scheduler in the data storage system is dynamically adjusted based on the specific workload being experienced by the data storage system. In particular, the new technology should advantageously operate such that the length of timeslices provided for executing host I/O request processing threads does not result in frequent preemptions of the host I/O request processing threads prior to completion of the tasks they perform.

To address the above described and other shortcomings of previous technologies, new technology is disclosed herein for dynamically adjusting a process scheduler in a storage processor of a data storage system. In the disclosed technology, the storage processor receives host I/O requests from at least one host computer, and processes the host I/O requests in the storage processor using host I/O request processing threads that execute on at least one processor in the storage processor. The host I/O request processing threads process sets of host data. The disclosed technology calculates an average amount of host data contained in each set of host data processed by the host I/O request processing threads, and also calculates an average amount of time required for each host I/O request processing thread to execute to completely process the average amount of host data contained in each set of host data processed by the host I/O request processing threads. The disclosed technology then adjusts operation of the process scheduler in the storage processor to cause the process scheduler to subsequently allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads.

For example, host I/O requests may be received and processed during a preceding sampling time period, e.g. a sampling time period having a period equal to some number of seconds. The average amount of host data contained in each set of host data processed by the host I/O request processing threads may be calculated after the preceding sampling time period, e.g. by calculating an average amount of host data contained in each set of host data processed by the host I/O request processing threads during the preceding sampling time period. Similarly, the average amount of time required for each host I/O request processing thread to execute to completely process the average amount of host data contained in each set of host data processed by the host I/O request processing threads may also be calculated after the preceding sampling time period, e.g. by calculating an average amount of time required for each host I/O request processing thread to execute to completely process the average amount of host data contained in each set of host data processed by the host I/O request processing threads during the preceding sampling time period. Operation of the process scheduler in the storage processor may also be adjusted after the preceding sampling time period, e.g. to cause the process scheduler to subsequently allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads during the preceding sampling time period.

In some embodiments, host data indicated by host I/O write requests received by the storage processor is initially stored in a persistent cache located in the storage processor. The host data may be flushed from the persistent cache in response to a cache flush event. In such embodiments, in the case where the host I/O requests received and processed by the storage processor during the preceding sampling time period consist of only host I/O write requests, the average amount of host data contained in each set of host data processed by the host I/O request processing threads during the preceding sampling time period may be calculated by setting the average amount of host data contained in each set of host data processed by the host I/O request processing threads during the preceding sampling time period to the size of an aggregation set of host data that is flushed from the persistent cache in response to a cache flush event.

In some embodiments, adjusting the operation of the process scheduler in the storage processor to cause the process scheduler to subsequently allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads may include i) multiplying the average amount of time required for each host I/O request processing thread to execute to completely process the average amount of host data contained in each set of host data processed by the host I/O request processing threads during the preceding sampling time period by an integer batch factor, and ii) setting a minimum duration of timeslices allocated by the process scheduler to execute host I/O request processing threads to the result of multiplying the average amount of time required for each host I/O request processing thread to execute to completely process the average amount of host data contained in each set of host data processed by the host I/O request processing threads during the preceding sampling time period by the integer batch factor.

In some embodiments, in the case where the host I/O requests received and processed by the storage processor during the preceding sampling time period consist of only host I/O read requests, the average amount of host data contained in each set of host data processed by the host I/O request processing threads during the preceding sampling time period may be calculated as an average size of the host I/O requests received during the preceding sampling time period.

Embodiments of the disclosed technology may provide significant improvements over previous technologies. For example, by setting the length of the timeslices provided for executing host I/O request processing threads to a value that is at least as large as the average amount of time required for each host I/O request processing thread to execute to completely process an average amount of host data contained in each set of host data processed by the host I/O request processing threads, the disclosed technology dynamically adjusts the process scheduler based on the specific workload being experienced by the data storage system. The disclosed technology avoids frequent preemptions of host I/O request processing threads while they are processing sets of host data. As a result, the disclosed technology avoids delaying the processing of sets of sets of host data while the scheduler executes other threads prior to resuming execution of interrupted host I/O request processing threads.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed upon illustrating the principles of various embodiments of the disclosed technology.

DETAILED DESCRIPTION

Embodiments of the invention will now be described. The embodiments described herein are only examples of how features and principles of the invention may be embodied. The invention itself is accordingly broader than the examples described below.

The technology described herein for dynamically adjusting a process scheduler in a storage processor of a data storage system operates by receiving host I/O requests from at least one host computer, and processes the host I/O requests in the storage processor using host I/O request processing threads that execute on at least one processor in the storage processor. The host I/O request processing threads that execute in the storage processor process sets of host data. An average amount of host data contained in each set of host data processed by the host I/O request processing threads is calculated, and an average amount of time required for each host I/O request processing thread to execute to completely process the average amount of host data contained in each set of host data processed by the host I/O request processing threads is also calculated. The operation of the process scheduler in the storage processor is then adjusted to cause the process scheduler to allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads.

Figure 1:
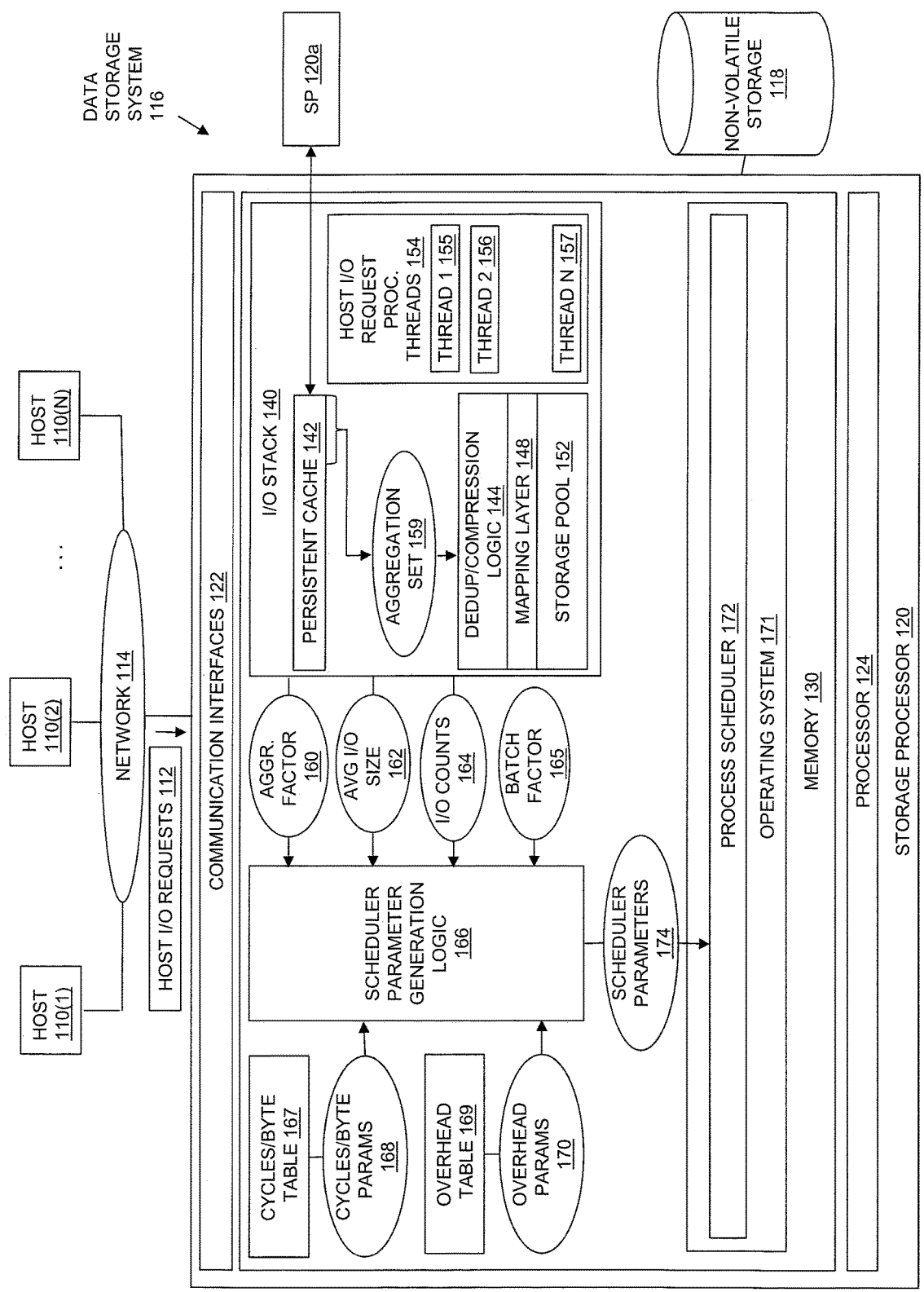
FIG. 1 is a block diagram showing an example of components in an operational environment including an embodiment of the disclosed technology.

FIG. 1 shows an example of an operational environment in which embodiments of the technology disclosed herein can operate, including an illustrative embodiment of the disclosed technology. As shown in FIG. 1, one or more host computers ("Hosts"), shown as host computers 110(1) through 110(N), and/or host applications executing in whole or in part on host computers 110(1) through 110(N), access non-volatile storage provided by a Data Storage System 116 over a Network 114. The Data Storage System 116 includes a Storage Processor 120 and Non-Volatile Storage 118. Data Storage System 116 may include multiple storage processors like Storage Processor 120. In some embodiments, multiple storage processors may be provided as circuit board assemblies, or "blades," which plug into a chassis that encloses and cools the storage processor. Those skilled in the art will recognize, however, that no particular configuration of storage processors is required, as any number of storage processors, including a single storage processor, may be provided and that Storage Processor 120 may be any type of computing device capable of processing host I/O requests.

Non-Volatile Storage 118 may include or consist of some number of disk drives. The disk drives in Non-Volatile Storage 118 may include magnetic disk drives, electronic flash drives, optical drives, and/or other types of non-volatile data storage drives or devices. In some embodiments, Non-Volatile Storage 118 may, for example, be organized into RAID groups, where each RAID group is composed of multiple disk drives in Non-Volatile Storage 118.

Network 114 may include or consist of any type of network or combination of networks, such as, for example, a storage area network (SAN), a local area network (LAN), a wide area network (WAN), the Internet, and/or some other type of network or combination of networks.

Hosts 110(1-N) and/or host applications executing in whole or in part on Hosts 110(1-N) may logically connect to and communicate with the Storage Processor 120 using various technologies. For example, Host I/O Requests 112 conveyed from Hosts 110(1-N) to Storage Processor 120 may include block I/O requests (read requests and/or write requests) communicated from Hosts 110(1-N) to Storage Processor 120 using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and/or protocols. Host I/O Requests 112 conveyed from Hosts 110(1-N) to Storage Processor 120 may further include file I/O requests (read requests and/or write requests) communicated from Hosts 110(1-N) to the Storage Processor 120 using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and/or protocols. Storage Processor 120 is accordingly configured to receive host I/O requests through both block-based and file-based protocols, and to respond to host I/O requests of either type by reading or writing the Non-Volatile Storage 118.

Storage Processor 120 may include one or more Communication Interfaces 122, at least one Processor 124, and Memory 130. The Communication Interfaces 122 of Storage Processor 120 may include, for example, SCSI target adapters and/or network interface adapters that convert electronic and/or optical signals received over Network 114 into electronic form for use by Storage Processor 120.

Processor 124 may be embodied as at least one processor core that is capable of independently reading and executing threads of program instructions as they are scheduled for execution on that processor core. Processor 124 may be integrated into a single central processing unit chip or chip package. Processor 124 may be a subset of the total number of processor cores contained in Storage Processor 120, or may be the only processor core contained in Storage Processor 120.

Memory 130 may include both volatile memory (e.g., RAM), and non-volatile memory (e.g. one or more ROMs, disk drives, solid state drives, and the like). Processor 124 and Memory 130 together may form specialized control circuitry, which is constructed and arranged to carry out specific methods and functions as described herein. As shown in FIG. 1, Memory 130 stores specialized software components and data structures that may be provided at least in part in the form of executable program instructions. When the executable instructions of the software components shown in FIG. 1 are executed by Processor 124, Processor 124 performs the methods and functionality of the software. Although certain specific software constructs are shown in FIG. 1 and described herein, those skilled in the art will recognize that Memory 130 may further include various other types of software constructs, which are not shown.

In the example of FIG. 1, Memory 130 includes an Operating System 171. Operating System 171 may, for example, include operating system components such as a Linux operating system kernel or the like. Operating System 171 includes a Process Scheduler 172, which allocates Processor 124 to execute threads on Processor 124. Process Scheduler 172 allocates Processor 124 to execute threads in time periods generally referred to as timeslices. During each timeslice, Processor 124 executes a single thread. Process Scheduler 172 indicates to Processor 124 which thread is to be executed during each timeslice, e.g. based in part on a scheduling data structure indicating a set of threads that are runnable on Processor 124, such as a queue or tree data structure (not shown). In some embodiments, Process Scheduler 172 may include or consist of one or more instances of the Completely Fair Scheduler (CFS) provided in some versions of the Linux kernel.

Process Scheduler 172 enables software executing in Storage Processor 120 to adjust certain parameters related to how Process Scheduler 172 schedules threads for execution on Processor 124. For example, in embodiments in which Process Scheduler 172 is embodied as part of a Linux kernel, Process Scheduler 172 may provide an interface that allows the values of one or more scheduler parameters to be dynamically adjusted. Such dynamically adjustable scheduler parameters may include a scheduling parameter sched_min_granularity_ns. The value of sched_min_granularity_ns (e.g. in nanoseconds) determines a minimum preemption granularity for each thread that executes on Processor 124. Process Scheduler 172 allocates each thread that executes on Processor 124 a timeslice having a duration that is at least as long as sched_mingranularity_ns. When Processor 124 is used to execute large numbers of runnable threads, the duration of the timeslice during which each thread is executed on Processor 124 by Process Scheduler 172 is equal to sched_mingranularity_ns.

As further shown in FIG. 1, Memory 130 includes an I/O stack 140. I/O Stack 140 provides program logic for processing the Host i/O Requests 112 received by the Storage Processor 120. Host I/O Requests 112 processed by I/O Stack 140 may include host I/O requests (e.g. host I/O read requests, host I/O write requests) directed to various types of block data objects hosted by Data Storage System 116 using Non-Volatile Storage 118, such as logical disks (e.g. logical units sometimes referred to as LUNs) and/or block-based virtual volumes (VVols). Host I/O requests processed by I/O Stack 140 may also or alternatively include host I/O requests (e.g. host I/O read requests, host I/O write requests) directed to file data objects hosted by Data Storage System 116 using Non-Volatile Storage 118, such as files or file systems. To execute the program logic in I/O Stack 140 in order to process Host I/O Requests 112, I/O Stack 140 creates Host I/O Request Processing Threads 154. Host I/O Request Processing Threads 154 are executed on Processor 124 by Process Scheduler 172. In the example of FIG. 1, Host I/O Request Processing Threads 154 is shown for purposes of illustration including Thread 1 155, Thread 2 156, and so on through Thread N 157. To process each one of the Host I/O Requests 112, the specific program logic in I/O Stack 140 needed to process that request is executed on Processor 124 using one or more of the threads in Host I/O Request Processing Threads 154.

In some embodiments, I/O Stack 140 may include a Persistent Cache 142, Deduplication/Compression Logic 144, Mapping Layer 148, and Storage Pool 152. Persistent Cache 142 may be implemented such that the contents of Persistent Cache 142 is not lost in the event of a power loss, system reboot, or other similar type of event. For example, Persistent Cache 142 may be implemented in whole or in part using non-volatile storage. In another example, Persistent Cache 142 may be implemented using DRAM (Dynamic Random Access Memory) that is mirrored to DRAM in at least one other storage processor (e.g., on a separate Storage Processor 120a), and the DRAM in both storage processors may be backed up by battery.

In some embodiments, Persistent Cache 142 may include or consist of a circular buffer that stores host data indicated by or included in Host I/O Requests 112, e.g. host data indicated by all host I/O write requests received by Storage Processor 120, whether or not the host data indicated by the request requires deduplication and/or compression. In some embodiments, host data indicated by or included in the host I/O write requests maybe stored at a head of the circular buffer when it is received by Storage Processor 120, and then subsequently flushed from a tail of the circular buffer. The circular buffer may have a limited or fixed size. Accordingly, as host data is added to the head of the circular buffer, it becomes more full, and as host data is flushed from the tail of the circular buffer, it becomes less full. For example, as Storage Processor 120 receives Host I/O Requests 112 at Communication Interfaces 122, it may pass the Host I/O Requests 112 to the I/O Stack 140 for further processing. Each host I/O write request in Host I/O Requests 112 may specify a data object (e.g. logical disk, file, etc.), and indicate host data that is to be stored in portions of non-volatile storage allocated from Non-Volatile Storage 118 to that data object. When each one of the host I/O write requests is received by Storage Processor 120, the specified host data may initially be stored in Persistent Cache 142, e.g. at the head of the circular buffer. Storage Processor 120 may then provide an acknowledgment to the host that issued the request once the host data indicated by the request has been securely stored in Persistent Cache 142, indicating successful completion of the request. This process may be repeated for additional host I/O write requests specifying additional host I/O data to be stored in non-volatile storage allocated from Non-Volatile Storage 118. Persistent Cache 142 accumulates the host data specified in these requests, e.g., at the head of the circular buffer in the order the data is received, and provides an acknowledgement in response to each request. In this way, host data specified by one or more host I/O write requests and directed to a data object hosted by Data Storage System 116 may be accumulated in Persistent Cache 142. In addition, in some embodiments, host data indicated for retrieval by one or more host I/O read requests in Host I/O Requests 112 may also be accumulated over time in and retrieved from Persistent Cache 142.

At some point in the course of accumulating host data indicated by write requests into Persistent Cache 142, a cache flush event is detected, e.g. by Persistent Cache 142 or some other component of the I/O Stack 140. The cache flush event indicates that multiple blocks of host I/O data accumulated in the circular buffer of Persistent Cache 142 are to be flushed from Persistent Cache 142, for deduplication and/or compression by Deduplication/Compression Logic 144 if needed (e.g. because the data object to which the host data belongs requires deduplication and/or compression), and then mapping to and storing within portions of non-volatile storage allocated from Non-Volatile Storage 118. As a result of such flushing of host I/O data from Persistent Cache 142, an increased amount of space within the circular buffer of Persistent Cache 142 becomes available to store host data indicated by subsequently received host I/O write requests. Examples of cache flush events include detecting that the circular buffer has reached or exceeded a predetermined or configured threshold maximum level of fullness (e.g. 80% full, 90% full, etc.), and/or detecting the expiration of a predetermined time period since one or more blocks of host data were stored into the circular buffer.

In response to detecting the cache flush event, an Aggregation Set 159 is formed, e.g. by Persistent Cache 142 or some other part of I/O Stack 140. Aggregation Set 159 is one example of a set of host data that may be processed by one or more of the threads in Host I/O Request Processing Threads 154 when the thread or threads is executed on Processor 124 by Process Scheduler 172. Aggregation Set 159 may consist of a subset of the total number of blocks of host data that have been accumulated in Persistent Cache 142. The host data contained in Aggregation Set 159 may, for example, consist of some number of blocks of host data that are located at a tail of the circular buffer in Persistent Cache 142, e.g. a set of the oldest blocks of host data that are stored in Persistent Cache 142. The amount of host data contained in Aggregation Set 159 may be equal to a multiple of the size of a single "block" of data in Data Storage System 116. For example, the size of a single "block" of data in Data Storage System 116 may be the size of a smallest allocatable unit of non-volatile storage in Non-Volatile Storage 118, such as, for example, eight kilobytes, or some other specific number of bytes.

Deduplication/Compression Logic 144 may perform data deduplication and/or data compression on the host data in Aggregation Set 159. For example, the data object to which the host data in Aggregation Set 159 is directed may require data deduplication and/or data compression. If data deduplication and/or compression is not required for the host data in Aggregation Set 159, the uncompressed host data in the Aggregation Set 159 may be passed directly to Mapping Layer 148 for mapping to and storage in non-volatile storage.

Data deduplication of the host data in Aggregation Set 159 may be accomplished by comparing aggregation sets of host data (e.g. sets of blocks contained in individual aggregation sets) to detect duplicates. For example, as it is generally known, in order to facilitate the comparison process, the aggregation set of host data flushed from Persistent Cache 142 may be assigned a crypto-digest, calculated by Deduplication/Compression Logic 144, typically using a cryptographic hash function, e.g. one of the secure hash algorithms in the SHA-2 family, such as SHA-512 or the like. If a crypto-digest calculated for Aggregation Set 159 matches a crypto-digest that was previously generated for a previously flushed and stored aggregation set of host data, then the host data in Aggregation Set 159 is a duplicate of the previously flushed and stored aggregation set, and only a relatively small pointer to the previously stored copy of the host data needs to be stored to represent Aggregation Set 159, thus reducing overall non-volatile storage requirements. When a read operation is subsequently received requesting some or all of the host data in Aggregation Set 159, the stored pointer enables the corresponding portion of the duplicate copy of the host data to be returned to the host.

In the case where Aggregation Set 159 is not a duplicate of previously stored data, Deduplication/Compression Logic 143 may perform data compression on the host data in Aggregation Set 159 prior to the host data in Aggregation Set 159 being stored to Non-Volatile Storage 118. The specific type of data compression performed by Deduplication/Compression Logic 144 on Aggregation Set 159 may be any type of lossless compression that identifies and eliminates statistical redundancy or redundancies in the host data, in such a way that the resulting compressed data may be decompressed without any loss of information. Examples of lossless compression that may be performed on Aggregation Set 159 include the LZ77 and/or LZ78 lossless data compression algorithms or variations thereof.

After any necessary data compression is performed on the host data in Aggregation Set 159, Mapping Layer 148 maps the compressed or uncompressed host data from Aggregation Set 159 to some portion of non-volatile storage in Non-Volatile Storage 118 that is allocated to the storage object to which the host data is written. For example, a Storage Pool 152 may be provided that organizes portions of Non-Volatile Storage 118 into slices, where a "slice" is a unit of non-volatile storage space (e.g. 256 megabytes or 1 gigabytes in size). Portions of slices may then be allocated from Storage Pool 152 to the specific data objects that are hosted by Data Storage System 116. Mapping Layer 148 may determine the non-volatile storage to which the compressed or uncompressed host data contained in Aggregation Set 159 is to be written based on the allocations in Storage Pool 152 of non-volatile storage to the specific storage object to which the host data in Aggregation Set 159 is to be written, as also indicated by the host I/O write request(s) received by Storage Processor 120 that indicated the host data.

Further during operation, at some point in time after a preceding sampling time period (e.g. following a preceding sampling time period having a duration equal to some number of seconds), during which Storage Processor 120 received and processed some number of host I/O requests, Scheduler Parameter Generation Logic 166 calculates an average amount of host data contained in each set of host data processed by the Host I/O Request Processing Threads 154 during the preceding sampling time period.

Also following the preceding sampling time period, Scheduler Parameter Generation Logic 166 calculates an average amount of time required for each of the Host I/O Request Processing Threads 154 to execute to completely process the average amount of host data contained in each set of host data processed by the Host I/O Request Processing Threads 154 during the preceding sampling time period.

Also following the preceding sampling time period, Scheduler Parameter Generation Logic 166 adjusts the operation of Process Scheduler 172 to cause Process Scheduler 172 to allocate Processor 124 to Host I/O Request Processing Threads 154 in timeslices that each have a duration that is at least as large as the average amount of time required for each of the Host I/O Request Processing Threads 154 to execute to completely process the average amount of host data contained in each set of host data processed by the Host I/O Request Processing Threads 154 during the preceding sampling time period. For example, Scheduler Parameter Generation Logic 166 may adjust the operation of Process Scheduler 172 periodically by passing Scheduler Parameters 174 to the interface to Process Scheduler 172 through which the values of scheduler parameters can be dynamically adjusted. The Scheduler Parameters 174 passed to Process Scheduler 172 may include a value for sched_min_granularity_ns that is at least as large as the average amount of time required for each of the Host I/O Request Processing Threads 154 to execute to completely process the average amount of host data contained in each set of host data processed by the Host I/O Request Processing Threads 154 during the preceding sampling time period. In this way, Scheduler Parameter Generation Logic 166 may operate to adjust the operation of Process Scheduler 172 to cause Process Scheduler 172 to subsequently allocate Processor 124 to Host I/O Request Processing Threads 154 in timeslices that each have a duration that is at least as large as the average amount of time required for each of the Host I/O Request Processing Threads 154 to execute to completely process the average amount of host data contained in each set of host data processed by the Host I/O Request Processing Threads 154, e.g. timeslices at least as large as the average amount of time required for each of the Host I/O Request Processing Threads 154 to execute to completely process the average amount of host data contained in each set of host data processed by the Host I/O Request Processing Threads 154 during a preceding sampling time period.

Figure 2:
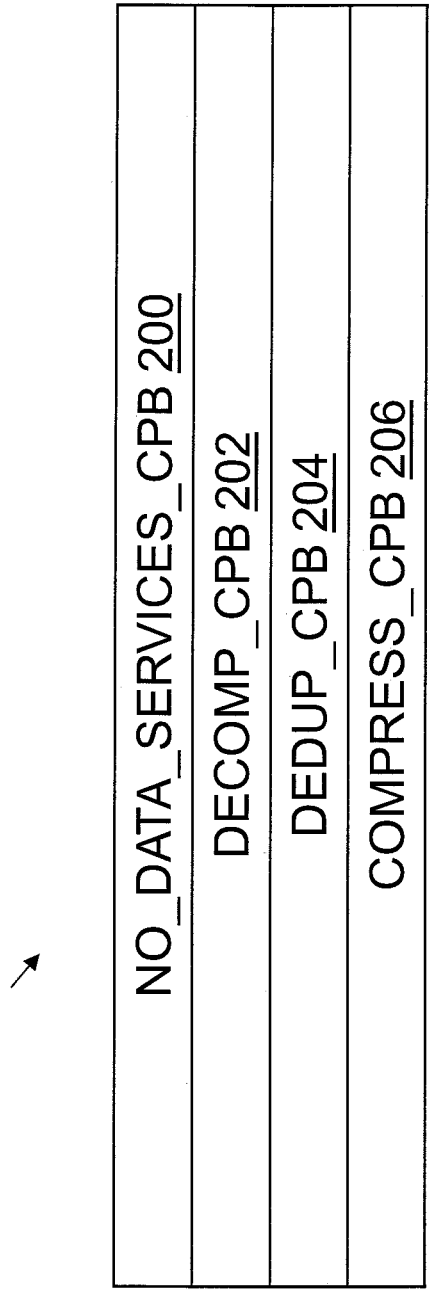
FIG. 2 is a block diagram showing an example of at least a portion of a cycles/byte table in some embodiments of the disclosed technology.

Scheduler Parameter Generation Logic 166 may operate in response to some number of Cycles/Byte Parameters 168 received from Cycles/Byte Table 167. Cycles/Byte Table 167 indicates the number of processor cycles per byte that are required when executing I/O Stack 140 to perform specific data services while processing host data indicated by host I/O requests received by Storage Processor 120. An example of Cycles/Byte Table 167 is shown in FIG. 2. Cycles/Byte Parameters 168 may include any or all of the values stored in Cycles/Byte Table 167. In some embodiments, the values in Cycles/Byte Table 167 may be determined prior to deployment of the Data Storage System 116, e.g. may be hardcoded.

As shown in FIG. 2, Cycles/Byte Table 167 may include NO_DATA_SERVICES_CPB 200, which stores the number of processor cycles needed per byte of host data when executing program logic in I/O Stack 140 to process a set of host data that does not require data compression, data decompression, or data deduplication.

Cycles/Byte Table 167 may also include DECOMP_CPB 202, which stores the number of processor cycles needed per byte of host data when executing program logic in I/O Stack 140 to perform data decompression on a set of compressed host data. In other words, DECOMP_CPB 202 is the number of processor cycles required by Deduplication/Compression Logic 144 to decompress host data, per byte of the set of host data being decompressed.

Cycles/Byte Table 167 may also include DEDUP_CPB 204, which stores the number of processor cycles needed per byte of host data when executing program logic in I/O Stack 140 to perform data deduplication on a set of host data. In other words, DEDUP_CPB 204 is the number of processor cycles required by Deduplication/Compression Logic 144 to deduplicate host data, per byte of the set of host data being deduplicated.

Cycles/Byte Table 167 may also include COMPRESS_CPB 206, which stores the number of processor cycles needed per byte of host data when executing program logic in I/O Stack 140 to perform data compression on a set of host data. In other words, COMPRESS_CPB 206 is the number of processor cycles required by Deduplication/Compression Logic 144 to compress host data, per byte of the set of host data being compressed.

Scheduler Parameter Generation Logic 166 may also operate in response to some number of Overhead Parameters 170 received from Overhead Table 169. Overhead Table 169 contains amounts of overhead processing required when executing I/O Stack 140 to prepare a set of host data for specific data services while processing host data indicated by host I/O requests received by Storage Processor 120. For example, the overhead processing indicated in Overhead Parameters 170 may represent the time required to perform data lookups such as cache lookups, or other types of overhead processing required before performing a data service such as data compression, data deduplication, or data decompression. The amounts of overhead processing indicated in Overhead Tale 169 may each be represented as an absolute number of cycles per byte, or alternatively as percentages of overhead processing relative to the cycles per byte values stored in Cycles/Byte Table 167 for processing the corresponding data service.

Figure 3:
FIG. 3 is a block diagram showing an example of at least a portion of an overhead table in some embodiments of the disclosed technology.

An example of Overhead Table 169 is shown in FIG. 3. Overhead Parameters 170 may include any or all of the values stored in Overhead Table 169. In some embodiments, the values in Overhead Table 169 may be determined prior to deployment of the Data Storage System 116, e.g. may be hardcoded.

As shown in FIG. 3, Overhead Table 169 may include NO_DATA_SERVICES_OVERHEAD 300, which stores a representation of the amount of overhead processing performed by program logic in I/O Stack 140 when preparing a set of host data that does not require data compression, data decompression, or data deduplication.

Overhead Table 169 may also include DECOMP_OVERHEAD 302, which stores a representation of the amount of overhead processing performed by program logic in I/O Stack 140 when preparing a set of host data for decompression by Deduplication/Compression Logic 144.

Overhead Table 169 may also include DEDUP_OVERHEAD 304, which stores a representation of the amount of overhead processing performed by program logic in I/O Stack 140 when preparing a set of host data for deduplication by Deduplication/Compression Logic 144.

Overhead Table 169 may also include COMPRESS_OVERHEAD 306, which stores a representation of the amount of overhead processing performed by program logic in I/O Stack 140 when preparing a set of host data for compression by Deduplication/Compression Logic 144.

Scheduler Parameter Generation Logic 166 may also operate in response to AGGR_FACTOR 160 received from I/O Stack 140. In some embodiments, AGGR_FACTOR 160 may be an aggregation factor equal to the size in bytes of Aggregation Set 159 during the preceding sampling time period.

Scheduler Parameter Generation Logic 166 may also operate in response to an AVG_IO_SIZE 162 calculated by I/O Stack 140 during the preceding sampling time period. In some embodiments, AVG_IO_SIZE 162 may the average size in bytes of the host I/O read requests that were received and processed by Storage Processor 120 during the preceding sampling time period. For example, if the average amount of host data requested by the host I/O read requests received and processed during the preceding sampling time period was 1 megabyte, then AVG_IO_SIZE 162 would have a value of 1,048,576.

Scheduler Parameter Generation Logic 166 may also operate in response to a number of I/O COUNTS 164 generated by i/O Stack 140 based on the host I/O requests received and processed by Storage Processor 120 during the preceding sampling time period. In some embodiments, I/O COUNTS 164 may include or consist of the following counts of specific types of host I/O requests received and processed during the preceding sampling time period:

i) IO_CNT: total number of I/O requests that were received and processed during the preceding sampling time period, ii) WR_IO_CNT: total number of host I/O write requests that were received and processed during the preceding sampling time period, iii) RD_IO_CNT: total number of host I/O read requests that were received and processed during the preceding sampling time period, iv) DECOMP_IO_CNT: total number of host I/O requests that were received and processed during the preceding sampling time period and that required decompression of host data, vi) NODS_RD_IO_CNT: total number of host I/O read requests that were received and processed during the preceding sampling time period and that required no data services, e.g. that required no decompression;

vi) NODS_WR_IO_CNT: total number of host I/O write requests that were received and processed during the preceding sampling time period and that required no data services, e.g. that required no compression and/or deduplication, v) COMP_IO_CNT: total number of host I/O requests that were received and processed during the preceding sampling time period and that required compression of host data, and vi) DEDUP_IO_CNT: total number of host I/O requests that were received and processed during the preceding sampling time period and that required deduplication of host data, e.g. that required calculation of a crypto-digest for host data.

Scheduler Parameter Generation Logic 166 may also operate in response to a BATCH_FACTOR 165 that may be a configurable or hard coded number (e.g. a positive integer having a value equal to one or greater) that indicates the number of sets of host data that are to be processed without interruption by individual threads in Host I/O Request Processing Threads 154 while executing on Processor 124.

In some embodiments, the following relationships are present in the input parameters to Scheduler Parameter Generation Logic 166:

IO_CNT=RD_IO_CNT+WR_IO_CNT
WR_IO_CNT=COMP_IO_CNT+DEDUP_IO_CNT+ NODS_WR_IO_CNT
RD_IO_CNT=DECOMP_IO_CNT+NODS_RD_IO_CNT

In some embodiments, Scheduler Parameter Generation Logic 166 performs the following calculations:

(1) A granularity value NODS_GRAN is calculated for the host I/O requests received and processed in the preceding sampling time period that required no data services as follows:

NODS_GRAN=NODS_CPB*(NODS_WR_IO_CNT+ NODS_RD_IO_CNT)/ IO_CNT*NO_DATA_SERVICES_OVERHEAD (2) A granularity value DECOMP_GRAN is calculated for the host I/O requests received and processed in the preceding sampling time period that required decompression of host data as follows:

DECOMP_GRAN=DECOMP_CPB*DECOMP_IO_CNT/IO_CNT*DECOMP_OVERHEAD (3) A granularity value COMP_GRAN is calculated for the host I/O requests received and processed in the preceding sampling time period that required compression of host data as follows:

COMP_GRAN=COMP_CPB*COMP_IO_CNT/IO_CNT* COMP_OVERHEAD (4) A granularity value DEDUP_GRAN is calculated for the host I/O requests received and processed in the preceding sampling time period that required deduplication of host data as follows:

DEDUP_GRAN=DEDUP_CPB*DEDUP_IO_CNT/IO_CNT DEDUP_OVERHEAD (5) A final granularity value FINAL_GRAN is calculated for all the host I/O requests received and processed in the preceding sampling time period as follows:

FINAL_GRAN=((NODS_GRAN+DECOMP_GRAN)*AVG_IO_SIZE+(COMP_GRAN+DEDUP_GRAN)*AGGR_FACTOR)*BATCH_FACTOR

In some embodiments, the calculated value of FINAL_GRAN may be adjusted if necessary to cause FINAL_GRAN to fall within a range of acceptable values between an upper limit and a lower limit, in order to ensure that any adjustment made to the operation of Process Scheduler 172 based on FINAL_GRAN does not cause Processor 124 to be allocated in timeslices that would result in unacceptable performance for a specific deployment or configuration of the Data Storage System 116. For example, a range of acceptable values for FINAL_GRAN, e.g. specific values of an upper limit and a lower limit for FINAL_GRAN, may be dynamically determined and set by the Data Storage System 116, and/or configured by a system administrator, and/or hardcoded in Scheduler Parameter Generation Logic 166.

Scheduler Parameter Generation Logic 166 may then multiply FINAL_GRAN by the cycle period of Processor 124 to generate a timeslice time period that is at least as large as the average amount of time required for each of the Host I/O Request Processing Threads 154 to execute to completely process the average amount of host data contained in each set of host data processed by the Host I/O Request Processing Threads 154 during the preceding sampling time period. For example, in the case where Processor 124 is a 4 GHz processor, and therefore operates at a rate of 4,000,000,000 clock cycles per second, multiplying FINAL_GRAN by.25 would result in a number of nanoseconds that is at least as large as the average amount of time required for each of the Host I/O Request Processing Threads 154 to execute to completely process the average amount of host data contained in each set of host data processed by the Host I/O Request Processing Threads 154 during the preceding sampling time period. In another example, in the case where Processor 124 is a 5 GHz processor, and therefore operates at a rate of 5,000,000,000 clock cycles per second, multiplying FINAL_GRAN by 0.20 would result in a number of nanoseconds that is at least as large as the average amount of time required for each of the Host I/O Request Processing Threads 154 to execute to completely process the average amount of host data contained in each set of host data processed by the Host I/O Request Processing Threads 154 during the preceding sampling time period. The preceding are only examples, and the disclosed technology may be embodied or configured to operate with any specific processor speed. Accordingly, in this way, embodiments of the Scheduler Parameter Generation Logic 166 may create a new value for sched_min_granularity_ns that is equal to FINAL_GRAN multiplied by the cycle period of Processor 124, and then pass that new value for sched_min_granularity_ns to Process Scheduler 172 in Scheduler Parameters 174 in order to cause Process Scheduler 172 to allocate Processor 124 to Host I/O Request Processing Threads 154 in timeslices that each have a duration that is at least as large as the average amount of time required for each of the Host I/O Request Processing Threads 154 to execute to completely process the average amount of host data contained in each set of host data processed by the Host I/O Request Processing Threads 154 during the preceding sampling time period.

In some embodiments, in the case where the host I/O requests received and processed by Storage Processor 120 during the preceding sampling time period consist only of host I/O write requests, then Scheduler Parameter Generation Logic 166 calculates an average amount of host data contained in each set of host data processed by the Host I/O Request Processing Threads 154 during the preceding sampling time period as a value that is equal to the size of the Aggregation Set 159, e.g. that is equal to Aggregation Factor 160. Accordingly, Scheduler Parameter Generation Logic 166 may, under such circumstances, create a new value for sched_min_granularity_ns that is at least as large as the average amount of time required for each of the Host I/O Request Processing Threads 154 to execute to completely process the amount of host data contained in Aggregation Set 159 during the preceding sampling time period.

In some embodiments, in the case where the value of Batch Factor 165 is greater than one, Scheduler Parameter Generation Logic 166 may create a new value for sched_min_granularity_ns that is equal to a multiple of the average amount of time required for each of the Host I/O Request Processing Threads 154 to execute to completely process the average amount of host data contained in each set of host data processed by the Host I/O Request Processing Threads 154 during the preceding sampling time period. For example, in the case where Batch Factor 165 is equal to four, Scheduler Parameter Generation Logic 166 may create a new value for sched_min_granularity_ns that is equal to four times the average amount of time required for each of the Host I/O Request Processing Threads 154 to execute to completely process the average amount of host data contained in each set of host data processed by the Host I/O Request Processing Threads 154 during the preceding sampling time period. Batch Factor 165 may be a configurable value, and those skilled in the art will recognize that the disclosed technology is not limited to an implementation or configuration with a specific value of Batch Factor 165.

In some embodiments, in the case where the host I/O requests received and processed by Storage Processor 120 during the preceding sampling time period consist only of host I/O read requests, then Scheduler Parameter Generation Logic 166 calculates an average amount of host data contained in each set of host data processed by the Host I/O Request Processing Threads 154 during the preceding sampling time period as a value that is equal to the average size in bytes of the host I/O read requests that were received and processed by Storage Processor 120 during the preceding sampling time period, e.g. equal to AVG_IO_SIZE 162. Accordingly, Scheduler Parameter Generation Logic 166 may, under such circumstances, create a new value for sched_min_granularity_ns that is at least as large as the average amount of time required for each of the Host I/O Request Processing Threads 154 to execute to completely process an amount of host data equal to the average size in bytes of the host I/O read requests that were received and processed by Storage Processor 120 during the preceding sampling time period, e.g. to completely process an amount of host data equal to AVG_IO_SIZE 162.

Figure 4:
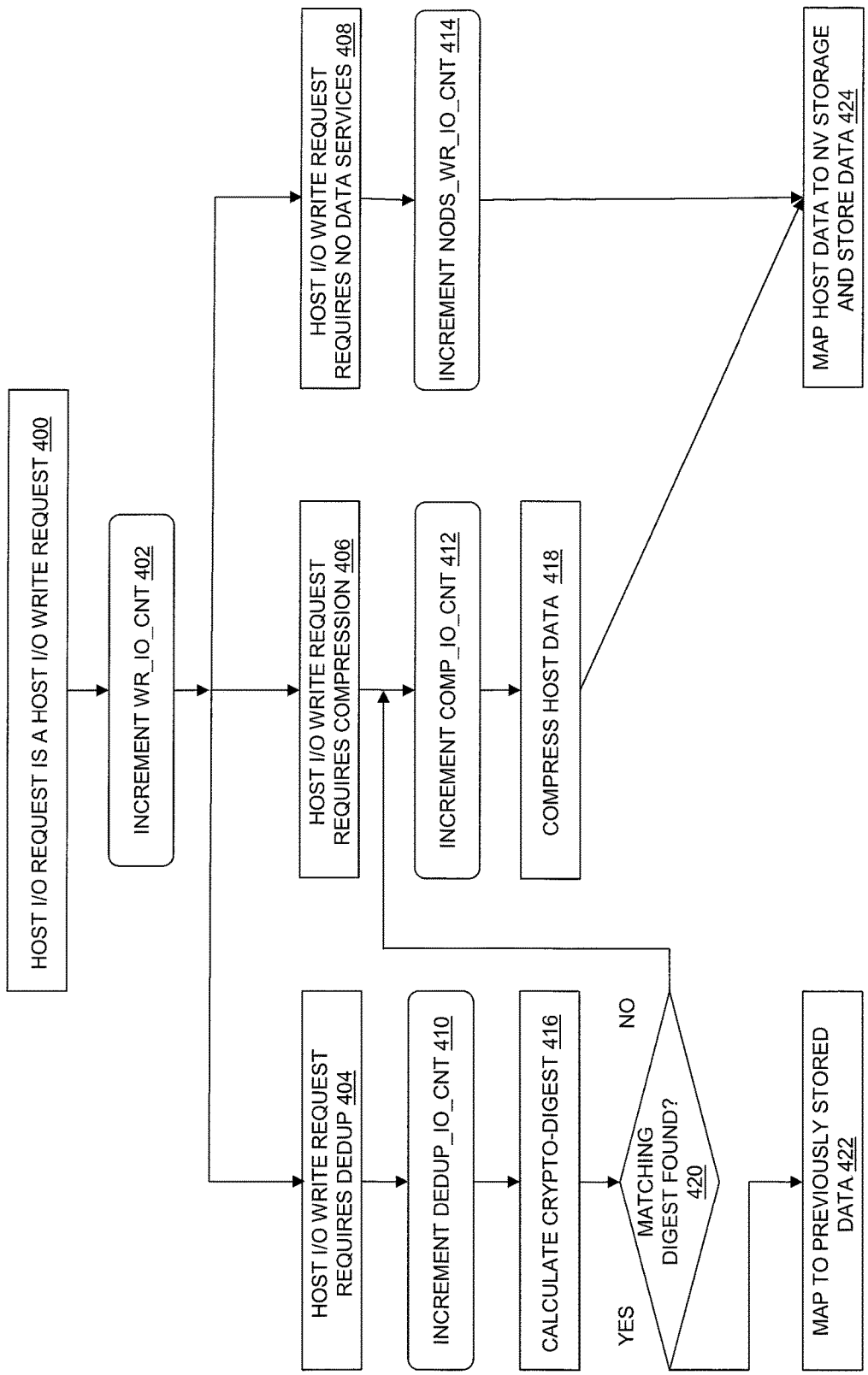
FIG. 4 is a flow chart showing an example of steps performed to process host I/O write requests and to generate I/O counts that describe the types of host I/O write requests processed by a storage processor during a sampling time period in some embodiments of the disclosed technology.

FIG. 4 is a flow chart showing an example of steps performed to process a host I/O write request and to generate I/O counts that describe the types of host I/O write requests processed by a storage processor during a sampling time period in some embodiments of the disclosed technology. The steps of FIG. 4 may, for example, be performed for each host I/O write request received and processed during a sampling time period by the I/O Stack 140 shown in FIG. 1.

At step 400, a host I/O request is identified as a host I/O write request. In response to the identification of the host I/O request as a host I/O write request at step 400, at step 402 the counter WR_IO_CNT is incremented.

At step 404, the host I/O write request is identified as a host I/O write request that requires data deduplication. For example, at step 404 the host I/O request may be identified as a host I/O write request directed to a storage object that requires deduplication of all host data written to that storage object. In response to the identification of the host I/O request as a host I/O write request that requires data duplication at step 404, at step 410 the counter DEDUP_IO_CNT is incremented.

At step 416 a crypto-digest is generated for the host data indicated by the host I/O request, e.g. a crypto-digest is generated when the host data indicated by the host I/O request is flushed from Persistent Cache 142 as part of Aggregation Set 159. A step 420, the disclosed technology compares the crypto-digest generated at step 416 to crypto-digests generated for previously flushed and stored aggregation sets of host data to determine whether the crypto-digest generated at step 416 matches a crypto-digest that was previously generated for a previously flushed and stored aggregation set of host data. If so, then the host data is a duplicate of a previously flushed and stored aggregation set, and step 420 is followed by step 422. In step 422, the host data for which the crypto-digest was generated at step 416 is mapped to the previously stored copy of the host data, so that only a pointer to the previously stored copy of the host data needs to be stored to represent the host data for which the crypto-digest was generated at step 416. Otherwise, if the crypto-digest generated at step 416 does not match nay crypto-digest that was previously generated for any previously flushed and stored aggregation set of host data, and the host data for which the crypto-digest was generated at step 416 requires data compression, then step 420 may be followed by steps 412, 418 and 424.

At step 406, the host i/O write request is identified as a host I/O write request that requires data compression. For example, at step 406 the host I/O request may be identified as a host I/O write request that is directed to a storage object that requires compression of all host data written to that storage object. In response to the identification of the host i/O request as a host I/O write request that requires compression at step 406, at step 412 the counter COMP_I-O_CNT is incremented.

At step 418, the host data indicated by the host I/O request is compressed, e.g. when the host data indicated by the host I/O request is flushed from Persistent Cache 142 as part of Aggregation Set 159. Step 418 is followed by step 424.

At step 408, the host I/O write request is identified as a host I/O write request that does not require any data services, e.g. does not require data deduplication or data compression. For example, at step 408 the host I/O request may be identified as a host I/O write request that is directed to a storage object that does not require deduplication or compression of host data written to that storage object. In response to the identification of the host I/O request at step 408 as a host I/O write request that does not require deduplication or compression of host data, at step 414 the counter NODS_WR_IO_CNT is incremented.

At step 424 the host data indicated by the host I/O write request is mapped to non-volatile storage contained in a non-volatile storage device in the data storage system and allocated to the data object to which to which the host data is directed, and then stored in that non-volatile storage. For example, the host data indicated by the host I/O write request, in either compressed or uncompressed form, may be mapped to non-volatile storage allocated to the data object to which the host data is directed and then stored in that non-volatile storage as part of an aggregation set of host data that was flushed from Persistent Cache 142, e.g. as part of Aggregation Set 159.

Figure 5:
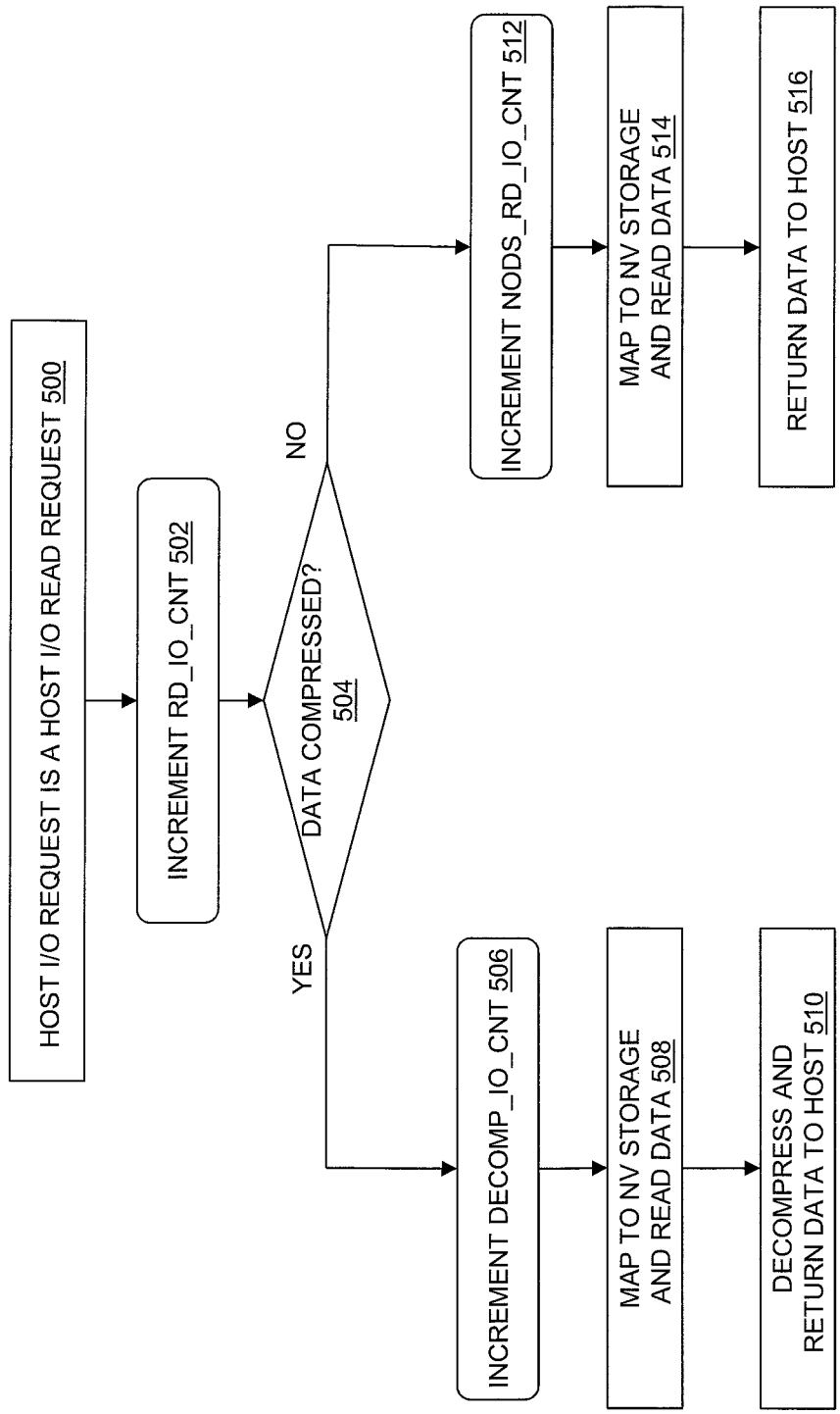
FIG. 5 is a flow chart showing an example of steps performed to process host I/O read requests and to generate I/O counts that describe the types of host I/O read requests processed by a storage processor during a sampling time period in some embodiments of the disclosed technology.

FIG. 5 is a flow chart showing an example of steps performed to process a host I/O read request and to generate I/O counts that describe the types of host I/O read requests processed by a storage processor during a sampling time period in some embodiments of the disclosed technology. The steps of FIG. 4 may, for example, be performed for each host I/O read request received and processed during a sampling time period by the I/O Stack 140 shown in FIG. 1.

At step 500, a host I/O request is identified as a host I/O read request. In response to the identification of the host I/O request as a host I/O read request at step 500, at step 502 the counter RD_IO_CNT is incremented.

A step 504, the disclosed technology determines whether the host data requested by the host I/O read request requires decompression, i.e. has previously been compressed. If the requested host data has previously been compressed, and therefore requires decompression, step 504 is followed by step 506. Otherwise, step 504 is followed by step 512.

At step 506, the counter DECOMP_IO_CNT is incremented. Step 506 is followed by step 508, in which the non-volatile storage that stores the compressed host data is identified (e.g. using Mapping Layer 148 and Storage Pool 152), and the compressed host data is retrieved from non-volatile storage. At step 510, the retrieved compressed host data is decompressed, and the decompressed host data is returned to the host that issued the host I/O read request.

At step 512, the counter NODS_RD_IO_CNT is incremented. Step 512 is followed by step 514, in which the non-volatile storage that stores the uncompressed host data is identified (e.g. using Mapping Layer 148 and Storage Pool 152), and the uncompressed host data is retrieved from non-volatile storage. At step 516, the uncompressed host data is returned to the host that issued the host I/O read request.

Figure 6:
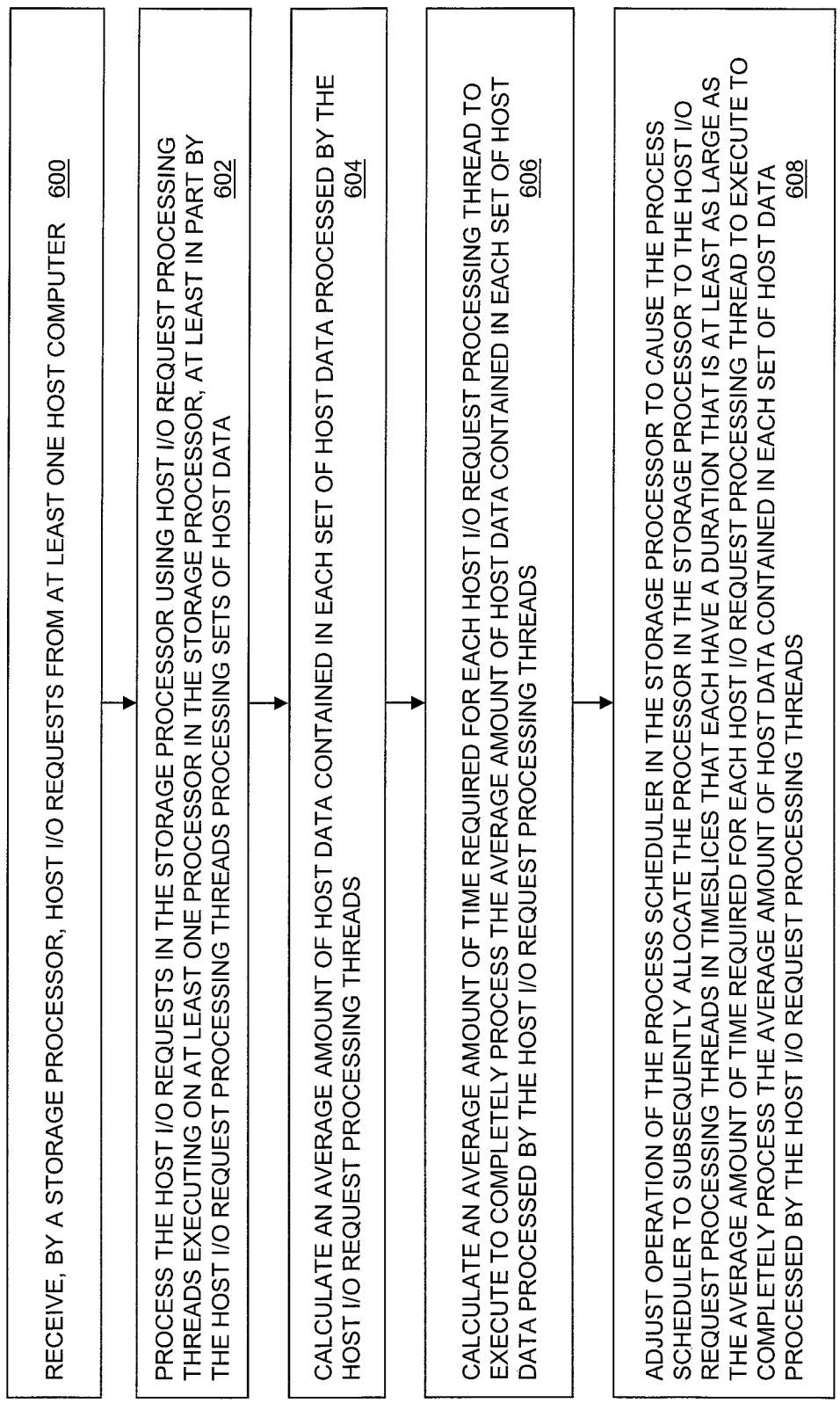
FIG. 6 is a flow chart showing steps performed during operation of some embodiments of the disclosed technology.

FIG. 6 is a flow chart showing steps performed during operation of some embodiments of the disclosed technology.

At step 600, a storage processor in a data storage system receives host I/O requests from at least one host computer.

At step 602, the storage processor process the received host I/O requests using host I/O request processing threads that execute on at least one processor in the storage processor, at least in part by the host I/O request processing threads processing sets of host data.

At step 604, the storage processor calculates an average amount of host data contained in each set of host data processed by the host i/O request processing threads.

At step 606, the storage processor calculates an average amount of time required for each host I/O request processing thread to execute to completely process the average amount of host data contained in each set of host data processed by the host I/O request processing threads.

At step 608, the storage processor adjusts the operation of the process scheduler in the storage processor to cause the process scheduler to allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads.

As will be appreciated by one skilled in the art, the technologies disclosed herein may be embodied as a system, method or computer program product. Accordingly, each specific feature of the present disclosure may be embodied using hardware, software (including firmware, resident software, micro-code, etc.) or a combination of software and hardware. Furthermore, the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media.

While the invention is described through the above exemplary embodiments, it will be understood by those of ordinary skill in the art that modification to and variation of the illustrated embodiments may be made without departing from the inventive concepts herein disclosed.

What is claimed is:

1. A method of dynamically adjusting a process scheduler in a storage processor of a data storage system, comprising the steps of:

receiving, by the storage processor during a preceding sampling time period, host I/O requests from at least one host computer;

processing the host I/O requests received during the preceding sampling time period in the storage processor during the preceding sampling time period using host I/O request processing threads executing on at least one processor in the storage processor, wherein the host I/O request processing threads process sets of host data;

after the preceding sampling time period, calculating an average amount of host data contained in each set of host data processed by the host I/O request processing threads during the preceding sampling time period;

after the preceding sampling time period, calculating an average amount of time required for each host I/O request processing thread to execute to completely process the average amount of host data contained in each set of host data processed by the host I/O request processing threads during the preceding sampling time period; and after the preceding sampling time period, adjusting operation of the process scheduler in the storage processor to cause the process scheduler to subsequently allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads during the preceding sampling time period.

2. The method of claim 1, wherein the host I/O requests received and processed by the storage processor during the preceding sampling time period comprise only host I/O write requests, and further comprising:

initially storing host data indicated by host I/O write requests received by the storage processor in a persistent cache located in the storage processor; and calculating the average amount of host data contained in each set of host data processed by the host I/O request processing threads during the preceding sampling time period by setting the average amount of host data contained in each set of host data processed by the host I/O request processing threads during the preceding sampling time period to a size of an aggregation set of host data that is flushed from the persistent cache in response to a cache flush event.

3. The method of claim 2, wherein adjusting the operation of the process scheduler in the storage processor to cause the process scheduler to subsequently allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads comprises:

multiplying the average amount of time required for each host I/O request processing thread to execute to completely process the average amount of host data contained in each set of host data processed by the host I/O request processing threads during the preceding sampling time period by an integer batch factor; and setting a minimum duration of timeslices subsequently allocated by the process scheduler to execute host I/O request processing threads to the result of multiplying the average amount of time required for each host I/O request processing thread to execute to completely process the average amount of host data contained in each set of host data processed by the host I/O request processing threads during the preceding sampling time period by the integer batch factor.

4. The method of claim 1, wherein the host I/O requests received and processed by the storage processor during the preceding sampling time period comprise only host I/O read requests, and further comprising:

calculating the average amount of host data contained in each set of host data processed by the host I/O request processing threads during the preceding sampling time period by setting the average amount of host data contained in each set of host data processed by the host I/O request processing threads during the preceding sampling time period to an average size of the host I/O requests received during the preceding sampling time period.

5. A storage processor in a data storage system, the storage processor including at least one processor and memory coupled to the processor, the memory storing instructions, wherein the instructions, when executed by the processor, cause the processor to:

receive host I/O requests from at least one host computer during a preceding sampling time period;

process the host I/O requests received during the preceding sampling time period during the preceding sampling time period using host I/O request processing threads executing on at least one processor in the storage processor, wherein the host I/O request processing threads process sets of host data;

after the preceding sampling time period, calculate an average amount of host data contained in each set of host data processed by the host I/O request processing threads during the preceding sampling time period;

after the preceding sampling time period, calculate an average amount of time required for each host I/O request processing thread to execute to completely process the average amount of host data contained in each set of host data processed by the host I/O request processing threads during the preceding sampling time period; and after the preceding sampling time period, adjust operation of the process scheduler in the storage processor to cause the process scheduler to subsequently allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads during the preceding time period.

6. The storage processor of claim 5, wherein the host I/O requests received and processed by the storage processor during the preceding sampling time period comprise only host I/O write requests, and further comprising:

a persistent cache for initially storing host data indicated by host I/O write requests received by the storage processor; and wherein the instructions, when executed by the processor, further cause the processor to:

calculate the average amount of host data contained in each set of host data processed by the host I/O request processing threads during the preceding sampling time period by setting the average amount of host data contained in each set of host data processed by the host I/O request processing threads during the preceding sampling time period to a size of an aggregation set of host data that is flushed from the persistent cache in response to a cache flush event.

7. The storage processor of claim 6, wherein the instructions, when executed by the processor, cause the processor to adjust the operation of the process scheduler in the storage processor to cause the process scheduler to subsequently allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads by causing the processor to:

multiply the average amount of time required for each host I/O request processing thread to execute to completely process the average amount of host data contained in each set of host data processed by the host I/O request processing threads during the preceding sampling time period by an integer batch factor; and set a minimum duration of timeslices subsequently allocated by the process scheduler to execute host I/O request processing threads to the result of multiplying the average amount of time required for each host I/O request processing thread to execute to completely process the average amount of host data contained in each set of host data processed by the host I/O request processing threads during the preceding sampling time period by the integer batch factor.

8. The storage processor of claim 5, wherein the host I/O requests received and processed by the storage processor during the preceding sampling time period comprise only host I/O read requests, and wherein the instructions, when executed by the processor, further cause the processor to:

calculate the average amount of host data contained in each set of host data processed by the host I/O request processing threads during the preceding sampling time period by setting the average amount of host data contained in each set of host data processed by the host I/O request processing threads during the preceding sampling time period to an average size of the host I/O requests received during the preceding sampling time period.

9. A non-transitory, computer-readable medium having instructions stored thereon which, when executed by at least one processor in a storage processor in a data storage system, cause the processor to perform a method of dynamically adjusting a process scheduler in the storage processor, the method comprising the steps of:

receiving, by the storage processor during a preceding sampling time period, host I/O requests from at least one host computer;

processing the host I/O requests received during the preceding sampling time period in the storage processor during the preceding sampling time period using host I/O request processing threads executing on at least one processor in the storage processor, wherein the host I/O request processing threads process sets of host data;

after the preceding sampling time period, calculating an average amount of host data contained in each set of host data processed by the host I/O request processing threads during the preceding sampling time period;

after the preceding sampling time period, calculating an average amount of time required for each host I/O request processing thread to execute to completely process the average amount of host data contained in each set of host data processed by the host I/O request processing threads during the preceding sampling time period; and after the preceding sampling time period, adjusting operation of the process scheduler in the storage processor to cause the process scheduler to subsequently allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads during the preceding sampling time period.

10. The non-transitory, computer-readable medium method of claim 9, wherein the host I/O requests received and processed by the storage processor during the preceding sampling time period comprise only host I/O write requests, and wherein the method performed by the processor when the instructions are executed on the processor further comprises:

initially storing host data indicated by host I/O write requests received by the storage processor in a persistent cache located in the storage processor; and calculating the average amount of host data contained in each set of host data processed by the host I/O request processing threads during the preceding sampling time period by setting the average amount of host data contained in each set of host data processed by the host I/O request processing threads during the preceding sampling time period to a size of an aggregation set of host data that is flushed from the persistent cache in response to a cache flush event.

11. The non-transitory, computer-readable medium method of claim 10, wherein the method performed by the processor when the instructions are executed on the processor further comprises:

adjusting the operation of the process scheduler in the storage processor to cause the process scheduler to subsequently allocate the processor in the storage processor to the host I/O request processing threads in timeslices that each have a duration that is at least as large as the average amount of time required for each host I/O request processing thread to execute to completely process the average amount of host data contained in each set of host data processed by the host I/O request processing threads by i) multiplying the average amount of time required for each host I/O request processing thread to execute to completely process the average amount of host data contained in each set of host data processed by the host I/O request processing threads during the preceding sampling time period by an integer batch factor, and ii) setting a minimum duration of timeslices subsequently allocated by the process scheduler to execute host I/O request processing threads to the result of multiplying the average amount of time required for each host I/O request processing thread to execute to completely process the average amount of host data contained in each set of host data processed by the host I/O request processing threads during the preceding sampling time period by the integer batch factor.

12. The non-transitory, computer-readable medium method of claim 9, wherein the host I/O requests received and processed by the storage processor during the preceding sampling time period comprise only host I/O read requests, and wherein the method performed by the processor when the instructions are executed on the processor further comprises:

calculating the average amount of host data contained in each set of host data processed by the host I/O request processing threads during the preceding sampling time period by setting the average amount of host data contained in each set of host data processed by the host I/O request processing threads during the preceding sampling time period to an average size of the host I/O requests received during the preceding sampling time period.

13. The method of claim 1 wherein the process scheduler comprises a process scheduler in an operating system of the storage processor.

14. The method of claim 1, wherein the host I/O requests received from the at least one host computer are directed to at least one block data object hosted by the data storage system.

15. The method of claim 1, wherein each set of host data processed by the host I/O request processing threads is accumulated in a persistent cache within the storage processor.

* * * * *